W. LAMB.
APPLIANCE FOR REFRACTING THE EYE.
APPLICATION FILED APR. 30, 1914.
1,128,693. Patented Feb. 16, 1915.
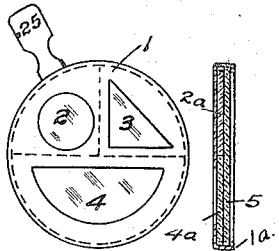
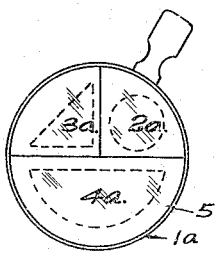
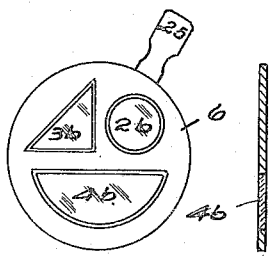
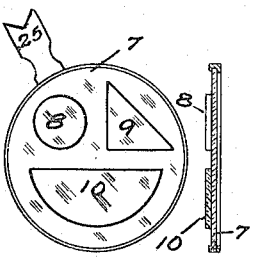
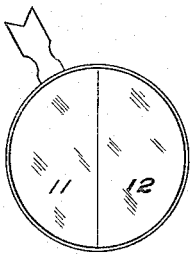
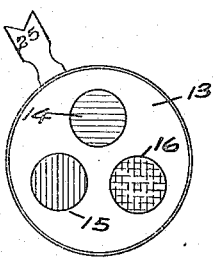
Witnesses
G. I. Lamb
Mary Wagner
Inventor
Walter Lamb

UNITED STATES PATENT OFFICE.

WALTER LAMB, OF BUFFALO, NEW YORK.

APPLIANCE FOR REFRACTING THE EYE.

1,128,693.  Specification of Letters Patent.  Patented Feb. 16, 1915.

Application filed April 30, 1914. Serial No. 835,573.

*To all whom it may concern:*

Be it known that I, WALTER LAMB, a citizen of the United States, residing at Buffalo, in the county of Erie, in the State of New York, have invented a new and useful Appliance for Refracting the Eye, of which the following is a specification.

My invention relates to improvements in refracting appliances in which a plurality of lenses is placed before the eye that is to be tested, so that they can be seen in quick succession; and the objects of my invention are—first: to secure a more accurate refraction; second—to conserve time. I attain these objects by the arrangement of lenses shown in devices illustrated in the accompanying drawings, any one of which may be selected for all the appliances in a trial set, if when duplicated, a series of lenses of increasing strength for the entire set, is installed.

Figure 1 is a front view of a device for the trial set; Fig. 2 is a vertical section of the same; Fig. 3 is a back view; Fig. 4 shows a front view of another device that may be used; Fig. 5 a vertical section of the same; Figs. 6, 8 and 9 show front views of different devices that may be employed and Fig. 7 is a vertical section of Fig. 6.

In Fig. 1 there is an opaque casing shown at 1, in which there are three openings at 2, 3 and 4 respectively, and through which lenses of different refractive power may be seen. These lenses extend beneath the case 1 to the dotted line shown in Fig. 1; in Fig. 2 the vertical section shows a transparent disk 5, which forms the back of the appliance and over the edges of which the case 1 is clasped at 1ª, lenses 2ª, 3ª, and 4ª are adjacent to the transparent disk 5, these three lenses are shown in Fig. 3 as they appear when seen through the transparent disk 5, which is clasped by the casing 1. Describing the other devices that may be used, Fig. 4 shows an opaque body 6, which has three openings extending through the same, and which are fitted with lenses 2ᵇ, 3ᵇ and 4ᵇ, all of different refractions; Fig. 5 shows a vertical section of the same; in Fig. 6 there are three different lenses 10, 8 and 9, cemented to a transparent disk 7, all of which are held in a ring—the transparent disk 7 is made translucent where the lenses 8, 9 and 10 are not cemented to it; Fig. 7 is a vertical section of Fig. 6; another variation is shown in Fig. 8 where a plurality of cylindrical lenses is shown mounted in a test ring; Fig. 9 also shows a device having a plurality of tinted lenses 14, 15 and 16 all permanently conjoined to a common rotatory body 13.

It will be noted that the plurality of lenses shown in each of the Figs. 1, 3, 4, 6 and 9 are clearly distinguishable one from another. The lenses in Figs. 1 to 6 inclusive are distinguishable by their shape; those in Fig. 9 by physical characteristics seen on the lenses; those in Fig. 8 by the handle on the ring. It will also be seen that when one of these appliances is put before the eye in a trial frame, whether alone or before a spherical lens, the eye will have three corrections before it and by a very slight movement of the head in reading the test type at a distance, these corrections may be compared in very quick succession, and the one that brings out the best vision may be selected. It is this quick comparison which makes the patient's decision as to the lenses much more accurate than it could be when a single correction is looked at and then taken away and replaced by another. It will be seen in these drawings that some of the handles attached to the test rings are straight at the end and some are not; this is to distinguish the spherical from the cylindrical lenses. The cylindrical lenses in each device are fixedly conjoined to a rotatory support and have their axes extending practically in the same direction and when one of these trial set accessories is revolved in a trial frame, all of the axes are changed alike. This trial set is intended to be supplementary and is applicable to cases ordinarily met with and is not intended to replace entirely the trial sets in use, where in some cases of astigmatism, the usual spherical lenses are to be utilized. The minus and plus lenses in this supplementary set are distinguishable one from another in practice by having the test rings finished in the usual way in white and gilt.

I claim:

1. In a device for testing vision, a plurality of lenses of different refraction, conjoined to a common support and contributing to make a disk-like appliance; having a circular edge which adapts it to trial frames; having a fixedness of attachment, which makes them non-revoluble, and having a proximity of the refractive parts to each other, which makes them comparable in test-type reading, by moving the head, and without changing the position of the appliance before the face, means by which the different lenses when in operation, may be distinguished by the patient.

2. In a device for testing vision a plurality of cylindrical lenses having their axes extending practically in the same direction and contributing to form a disk-like appliance with an edge formation which makes it rotatory and adapts it to trial frames, the refractive parts formed by the non-revoluble cylindrical lenses having a proximity to each other which makes them comparable in test-type reading by moving the head and without changing the position of the appliance before the face.

3. In a device for testing vision, a plurality of cylindrical lenses having their axes extending practically in the same direction, and being fixedly conjoined to a common support, and contributing to form a disk-like appliance with a circular edge which makes it rotatory, and adapts it to trial frames; the refractive parts formed by the non-revoluble cylindrical lenses, having a proximity to each other which makes them comparable in test-type reading, by moving the head and without changing the position of the appliance before the face, a means by which the different lenses when in operation, may be distinguished by the patient.

4. In a device for testing vision, a plurality of lenses fixedly conjoined to a disk-like body, which is rotatory and adapted to trial frames; these refractive parts having a proximity to each other which makes them comparable in test-type reading by moving the head, and without changing the position of the appliance before the face, and not requiring the appliance to be revolved on its axis for these lenses to come into action, a disparity of physical characteristics in connection with the different lenses, which makes them distinguishable by the patient when they are in operation.

WALTER LAMB.

Witnesses:
G. I. LAMB,
CHARLES BECK.

Copies of this patent may be obtained for five cents each, by addressing the "Commissioner of Patents, Washington, D. C."